(12) United States Patent
Ramisa Usero

(10) Patent No.: US 10,058,103 B2
(45) Date of Patent: Aug. 28, 2018

(54) DEVICE FOR AUTOMATIC PEELING SAUSAGES

(71) Applicant: ARCTECNO APLICACIONES, S.L., Girona (ES)

(72) Inventor: Joan Ramisa Usero, Girona (ES)

(73) Assignee: ARCTECNO APLICACIONES, S.L., Girona (ES)

( * ) Notice: Subject to any disclaimer, the term of this patent is extended or adjusted under 35 U.S.C. 154(b) by 0 days.

(21) Appl. No.: 15/622,198

(22) Filed: Jun. 14, 2017

(65) Prior Publication Data

US 2017/0318823 A1 Nov. 9, 2017

(30) Foreign Application Priority Data

May 5, 2016 (EP) .................................... 16001021

(51) Int. Cl.
*A22C 11/00* (2006.01)

(52) U.S. Cl.
CPC ................................. *A22C 11/003* (2013.01)

(58) Field of Classification Search
CPC ............................... A22C 11/00; A22C 13/00
USPC ..................................................... 452/50, 49
See application file for complete search history.

(56) References Cited

U.S. PATENT DOCUMENTS

| | | | | |
|---|---|---|---|---|
| 4,637,095 A * | 1/1987 | Maruska | ............... | A22C 11/00 452/50 |
| 5,184,541 A * | 2/1993 | Klyce | .................. | A22C 11/001 452/50 |
| 5,649,858 A * | 7/1997 | Williams | ............. | A22C 11/003 452/50 |
| 6,045,441 A * | 4/2000 | Christensen | ......... | A22C 11/003 452/50 |
| 6,059,647 A * | 5/2000 | Imaura | .................... | B65B 69/00 452/50 |
| 6,354,931 B1 * | 3/2002 | Klyce | .................. | A22C 11/003 452/50 |
| 7,377,842 B2 * | 5/2008 | Painter | ................. | A22C 11/003 452/50 |

* cited by examiner

*Primary Examiner* — Richard T Price, Jr.
(74) *Attorney, Agent, or Firm* — Hoglund & Pamias, PSC; Roberto J. Rios

(57) ABSTRACT

The device consists of a supply area (2) through which a conveyor belt (3) is fed above which a moistening station (4) is arranged by means of which the skin of the sausage is softened in order for the sausage to then be perforated and injected in order for said internal air flow to cause the skin to detach from the meat in the corresponding gripping and blowing station (6). It is then subjected to transversal cutting with a guillotine mechanism (16) and then to longitudinal cutting (18) while the skins are removed underneath by means of a pair of toothed wheels (23), the clean product coming out by way of an outlet conveyor belt (24).

9 Claims, 3 Drawing Sheets

DEVICE FOR AUTOMATIC PEELING SAUSAGES

OBJECT OF THE INVENTION

The present invention relates to equipment which has been especially conceived for automatically peeling sausages.

The object of the invention is thus to provide a machine which is fed with cured pieces of sausage, it can be adapted to different calibers and lengths such that at the outlet of the machine the product without skin is obtained in order to be subsequently cut into slices, the machine itself is responsible for redirecting the waste towards a storage area for the subsequent treatment thereof.

BACKGROUND OF THE INVENTION

In the scope of practical application of the invention, that of sausages, it is common for the same to be sold both inside the intestine it was cured in and cut into slices and packaged on trays.

In the second case, either the slicing and packaging is carried out completely automatically, or the sausage is packaged without peeling or it has to be peeled manually by the operators before introducing the pieces into the slicing machine.

It would thus be desirable to have a machine which allows the peeling of the sausages to be carried out automatically, in order to automate the entire process.

Attempting to overcome this problem, the present applicant is also the proprietor of the European patent EPO 2923579 "Machine for automatically peeling cured sausage" in which a machine for automatically peeling sausages is described, composed of a frame in which a first supply area of the product to be processed is defined, a cutting and peeling area, an outlet area of the clean and finished pieces and a final area towards which the waste is redirected for the subsequent treatment thereof such that the supply area consists of a type of inclined tray or guide on which the pieces are deposited, equipped with a mechanism for discharging the pieces on a guide arranged in the cutting area which is complemented by conveyor belts which longitudinally displace the piece along the guide such that in said area a longitudinal cutting knife is arranged as well as, in correspondence with the outlet end of the pieces, a mechanism for gripping the intestine and diverting the waste to the waste area and a transversal cutting knife, the outlet area including means for removing the clean pieces to the collection area.

The present applicant has been able to check that this installation is not as entirely effective as it should be since the intestine becomes strongly adhered to the sausage in normal humidity and temperature conditions, to which is added the fact that the mechanisms provided for cutting and removing the skins are also not suitable.

DESCRIPTION OF THE INVENTION

The device which is envisaged solves the previously stated problem fully satisfactorily.

To this end, and starting from a frame in which a receiving area of the product to be processed is defined, as is essential, it is envisaged that after said area a first station for moistening the skin of the sausage is arranged, in which the sausages, by way of a conveyor belt, are made to pass below a plurality of nozzles spraying pressurized water by means of which the skin of said sausages is moistened, which will subsequently facilitate the peeling of the same.

The moistening station deposits the moist pieces in a second work station in which a mechanism for gripping and blowing the intestine is arranged.

This mechanism consists of a type of punch associated with a hydraulic arm which is vertically displaced over the product deposited in the station and which moves within a conical housing being passed through the lower vertex thereof such that said conical housing defines a diffuser which is fed by a compressed air system.

Based on this structuring, the hydraulic arm displaces the punch/diffuser assembly downwards until the diffuser enters into contact with the surface of the sausage, at which time the diffuser is stabilized, while the punch is made to descend slightly further until penetrating the skin of the sausage, through which an air current is injected, which is redirected between the body of the sausage and the skin thereof, causing the latter to easily detach from the sausage since it had been previously moistened.

After this operation, the sausage is cut transversally at the front end thereof by means of a guillotine mechanism and it is made to advance over a circular knife arranged longitudinally which cuts the skin of said sausage in a longitudinal direction according to one of the imaginary generatrices thereof.

Said advancing movement is utilized for removing the cut skin such that the sausage is made to pass over a pair of toothed wheels such that upon entering into contact exclusively with the skin of said sausage they trap said skins, pulling them downwards and the clean sausage is displaced towards the outlet area of the machine.

In order to optimize the removal of the intestine, it has been envisaged that a pipe associated with a suction compressor is arranged immediately below the toothed wheels which pull said intestine and the suction compressor redirects said skins towards a waste container.

A much more effective machine is thereby achieved which ensures complete removal of the skin from the sausage without the risk of it coming out unpeeled or partially peeled, as occurs with other known systems.

DESCRIPTION OF THE DRAWINGS

In order to complement the description which will be given below and with the aim of aiding a better understanding of the characteristics of the invention, according to a preferred practical exemplary embodiment of the same, a set of plans are enclosed as an integral part of said description, in which in an illustrative and non-limiting manner, the following is depicted.

PREFERRED EMBODIMENT OF THE INVENTION

Figure 1:
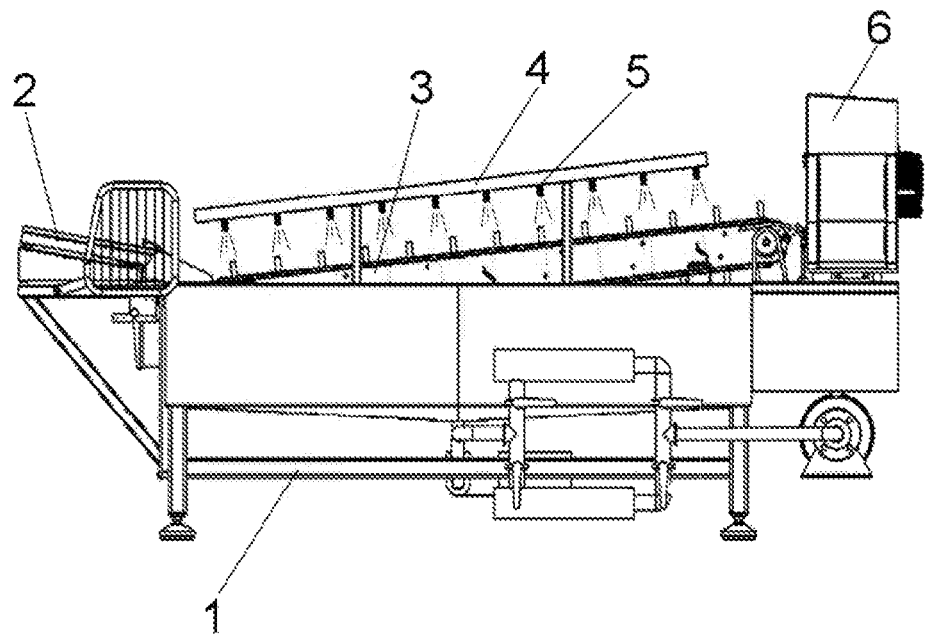
FIG. 1 shows a lateral elevation view of the two initial moistening and gripping and blowing stations which are arranged in a device for automatically peeling sausages implemented according to the object of the present invention.

In view of the mentioned figures and especially FIG. 1, it can be observed how the device which is envisaged consists of a frame (1), in which a supply area (2) of the sausages to be processed is defined, said sausages are deposited on a conveyor belt (3) which makes said pieces pass below a moistening station (4) in which a plurality of nozzles (5) spraying pressurized water are defined by means of which the skin of the pieces of sausage are moistened and then these are softened before passing to the following station.

Figure 2:
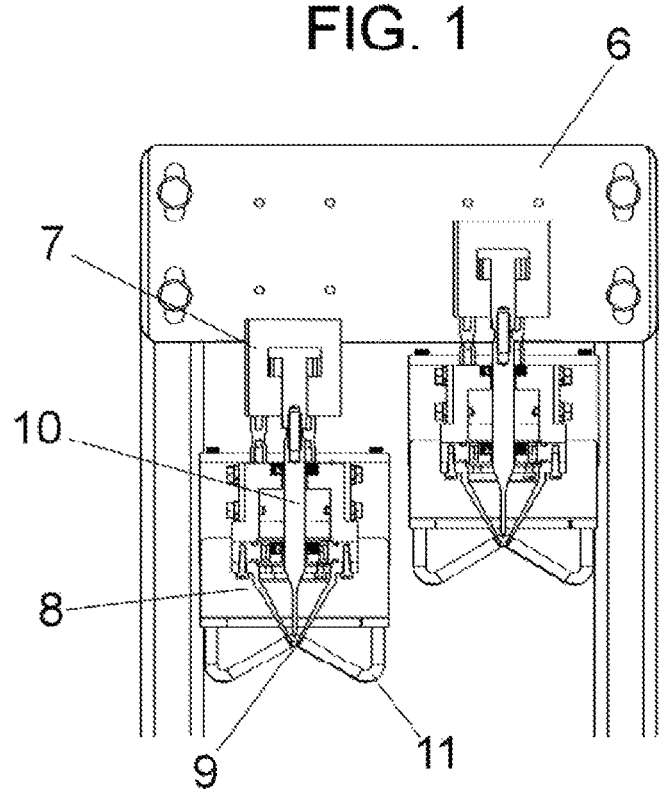
FIG. 2 shows a sectional detail of the second station for gripping and blowing the pieces.

The conveyor belt (3) discharges the sausages with the skin thereof moistened on a gripping and blowing station (6), the one shown in detail in FIG. 2, in which arms (7) vertically displaceable over the piece of sausage to be processed are defined, the arms incorporate a conical housing (8) acting as a pressurized air diffuser with a lower hole (9) through which the air is driven and within which a punch (10), also vertically displaceable, such that the arm (7) is displaced downwards until the piece of sausage is stabilized by means of stabilizing grilles (11), a position in which the punch (10) is made to descend in order to perforate the skin of the sausage and pressurized air is injected through said hole in order to cause a flow of air between the skin and the sausage per se, causing the detaching of the skin.

Figure 3:
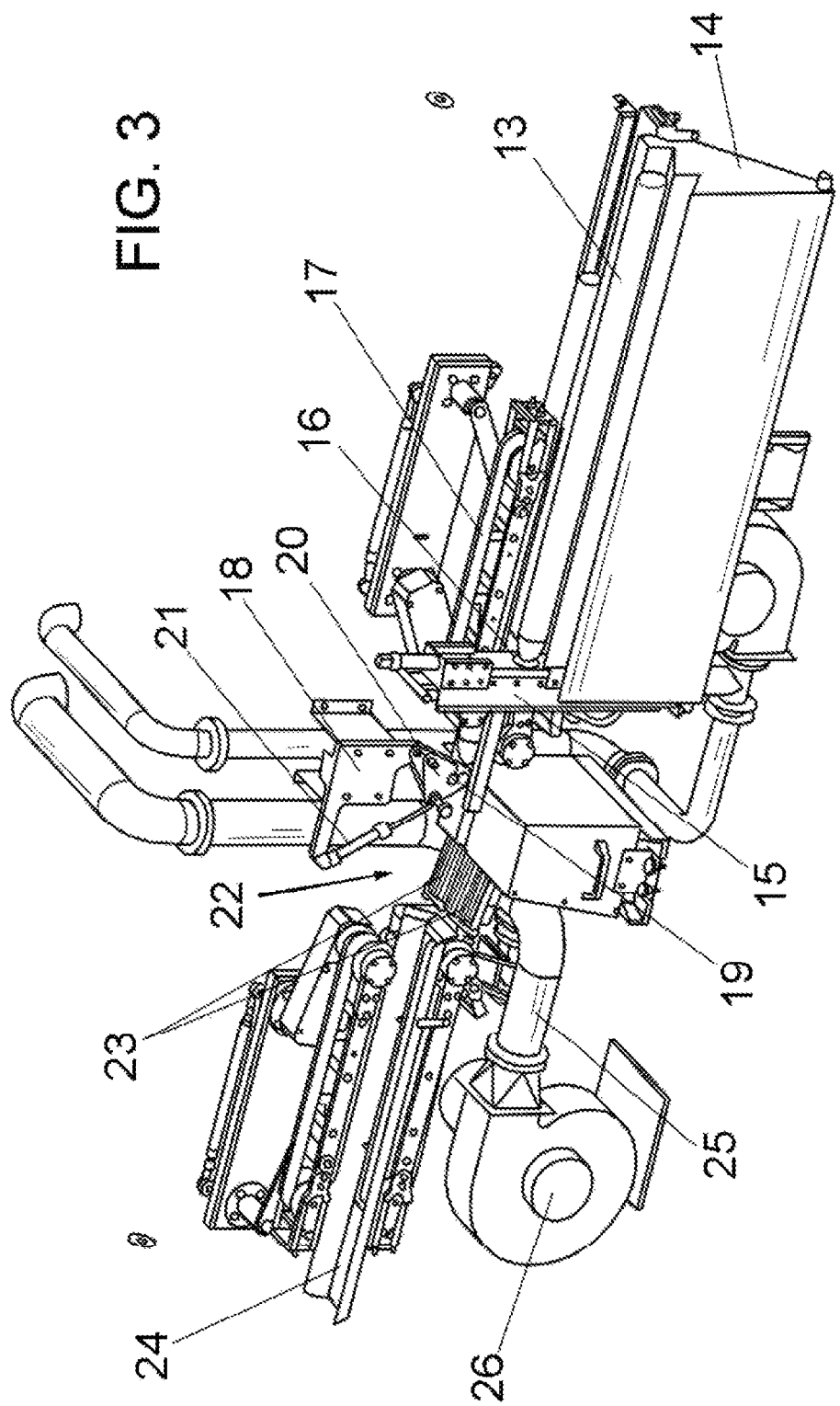
FIG. 3 shows a perspective view of the assembly of the three final stations which are defined in the installation and which are grouped into one single frame which is arranged perpendicular to the assembly shown in FIG. 1 and which correspond to the transversal cutting mechanism, to the longitudinal cutting mechanism, to the mechanism for removing the intestines and the corresponding outlet belt of the clean product.
Figure 4:
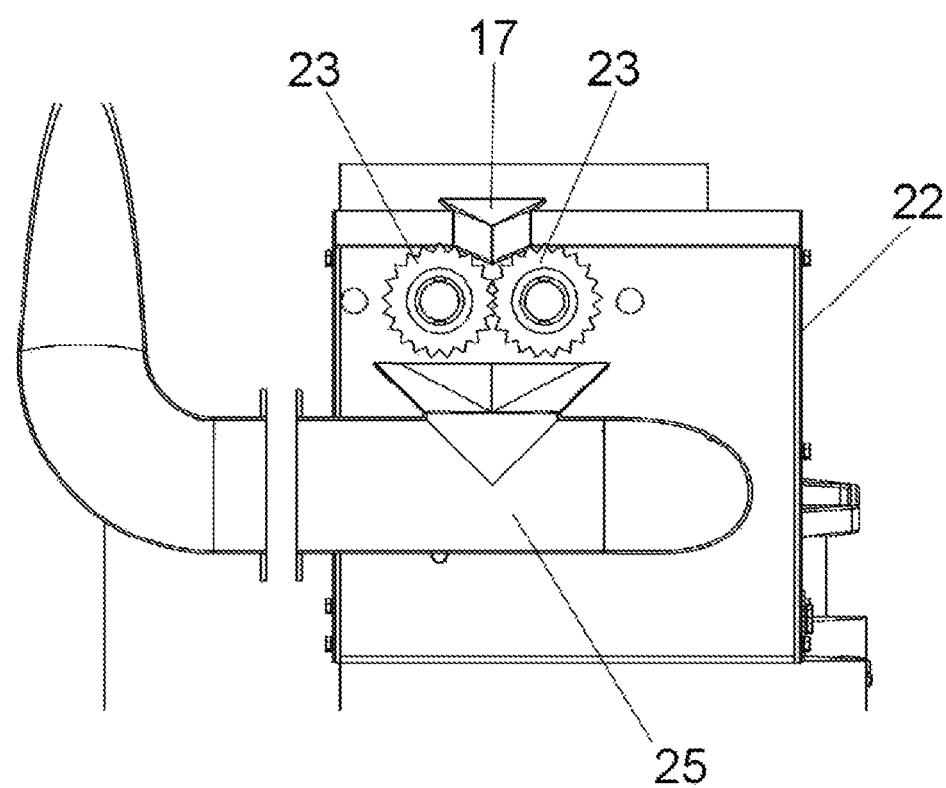
FIG. 4 lastly shows a profile detail of the mechanism for pulling and removing the skins/intestines.

The sausages, once subjected to this process, are automatically deposited in a transversal cutting station (14), visible in FIG. 3, in which a column (15) with a guillotine mechanism (16) is defined by means of which the front tip of the piece of sausage (13) is transversally cut.

By means of pushers, not visible in the figures, the piece is displaced with the front tip thereof cut towards a conveyor (17) which axially displaces said pieces of sausage such that during said displacement the sausage is made to pass through a longitudinal cutting station (18) in which a circular knife (19) associated with a swinging arm (20) regulated by a cylinder (21) is arranged by means of which the proximity of the knife to the sausage is regulated such that it can be adapted to sausages of different diameters.

In parallel with the longitudinal cutting process of the skin, it is envisaged that the skin is removed by a station for removing the skins (22) in which two toothed wheels (23) are defined over which the sausage is made to pass such that the wheels pinch the skin and pull it downwards leaving the sausage to advance already peeled towards an outlet belt (24) with the particularity that a pipe (25) associated with a suction compressor (26) is arranged below the toothed wheels (23), said pipe redirects said skins towards a waste container.

Optimal peeling of the sausages is thereby achieved completely automatically and it can be adapted to sausages of very different sizes.

The invention claimed is:

1. A device for automatically peeling sausages comprising:

a sausage receiving area;
a first conveyor belt coupled to an outlet of said sausage receiving area and configured to receive sausages from said sausage receiving area;
a moistening station positioned above said first conveyor belt and comprising a plurality of nozzles configure to spray pressurized water over sausages moving on said first conveyor belt;
a gripping and blowing station coupled to said first conveyor belt and configured to introduce air between the skin and the sausage meat of sausages received from said first conveyor belt;
a transversal cutting station coupled to said gripping and blowing station and including a guillotine mechanism configured to transversally cut an end of air-inflated sausages received from said gripping and blowing station;
a second conveyor belt configured to receive sausages with a cut end from said transversal cutting station;
a longitudinal cutting station configured to longitudinally cut the skin of sausages moved by said second conveyor belt;
a skin removing section configured to receive and remove the cut skin from sausages moved by said second conveyor belt; and
an outlet conveyor belt configured to receive the sausage with the skin removed.

2. The device of claim 1, wherein the gripping and blowing station comprises a plurality of vertically displaceable arms, each having: a vertically displaceable punch, a conical housing with a lower hole and stabilizing grilles arranged at a lower end of said vertically displaceable arms so that said stabilizing grilles stabilize a sausage when said vertically displaceable arms is lowered, said vertically displaceable punch cuts a skin of said sausage and said conical housing acts as a pressurized air diffuser with said lower hole driving pressurized air between the skin and the sausage meat of said sausage.

3. The device of claim 1, wherein said second conveyor belt is configured to move said sausage by contacting an upper portion of the sausage.

4. The device of claim 1, wherein said longitudinal cutting station includes a circular knife longitudinally cutting the skin of sausages moved by said second conveyor belt.

5. The device of claim 4, said longitudinal cutting station further comprises a swinging arm regulated by a cylinder selectively regulating the distance of the circular knife to the sausage.

6. The device of claim 5, wherein said distance is regulated to cut the skin of sausages of different diameters.

7. The device of claim 1, wherein said skin removing section comprises a plurality of toothed wheels positioned under the sausage so that the toothed wheels pinch and remove the skin of the sausage while being moved by said second conveyor belt.

8. The device of claim 7, wherein the removed skin is directed to a pipe with a suction compressor.

9. The device of claim 8, wherein the removed skin is directed towards a waste container.

* * * * *